US006578658B2

(12) United States Patent
Jones et al.

(10) Patent No.: US 6,578,658 B2
(45) Date of Patent: Jun. 17, 2003

(54) ACCOUSTIC CHAMBER INTEGRATED WITH VEHICLE DOOR

(75) Inventors: Stephen P. Jones, Commerce, MI (US); Michael James Twork, White Lake, MI (US); Karl Jon Mertz, Ferndale, MI (US); Said Ali Shebak, Livonia, MI (US)

(73) Assignee: SAI Automotive USA-SAL, Inc., Farmington Hills, MI (US)

( * ) Notice: Subject to any disclaimer, the term of this patent is extended or adjusted under 35 U.S.C. 154(b) by 10 days.

(21) Appl. No.: 09/758,710

(22) Filed: Jan. 11, 2001

(65) Prior Publication Data

US 2001/0030078 A1 Oct. 18, 2001

Related U.S. Application Data

(60) Provisional application No. 60/175,424, filed on Jan. 11, 2000.

(51) Int. Cl.[7] ................................................ H05K 5/00
(52) U.S. Cl. ........................................ 181/141; 181/150
(58) Field of Search ................................ 181/141, 150, 181/199; 381/86, 87, 88, 188, 205

(56) References Cited

U.S. PATENT DOCUMENTS

| 4,277,653 A | 7/1981 | Pawelzick |
| 4,502,149 A | 2/1985 | Gefvert |
| 4,550,796 A | 11/1985 | Tomita |
| 4,728,143 A | 3/1988 | Tanino et al. |
| 4,905,860 A | 3/1990 | Kurihara et al. |
| 5,008,944 A | 4/1991 | Sels et al. |
| 5,218,175 A | 6/1993 | Scarlata |
| 5,591,946 A | 1/1997 | Jehle et al. |
| 5,663,534 A | 9/1997 | Von Hagen et al. |
| 5,736,689 A | * 4/1998 | Van Hout et al. ............ 181/141 |
| 5,750,942 A | 5/1998 | Flick |
| 5,754,664 A | 5/1998 | Clark et al. |
| 5,820,191 A | 10/1998 | Blakewood, Jr. et al. |
| 5,920,039 A | 7/1999 | Cote et al. |
| 5,967,585 A | 10/1999 | Sprague |
| 5,979,590 A | 11/1999 | Telmos |

FOREIGN PATENT DOCUMENTS

| DE | 3606166 A1 | 8/1987 |
| DE | WO 98/38056 | 9/1998 |
| DE | WO99/32312 | 7/1999 |
| DE | WO 99/36281 | 7/1999 |

* cited by examiner

*Primary Examiner*—Khanh Dang
(74) *Attorney, Agent, or Firm*—Lerner, David, Littenberg, Krumholz & Mentlik, LLP

(57) ABSTRACT

An acoustic chamber formed in door of a vehicle includes a metal door inner panel having an aperture extending therethrough, and a door module secured in the aperture of the door inner panel. The door module includes an indentation and may be made of a polymer or a fibrous material. An interior door trim panel overlies the door module and a loudspeaker is secured between the interior door trim panel and the door module. The interior door trim panel may include a bulge opposing the indentation in the door module, with the loudspeaker located between the bulge and the indentation. A sealing element is secured between the door module and the interior door trim panel for defining an acoustic chamber between the door module and the interior door trim panel. The acoustic chamber enhances the performance of the loudspeaker, thereby allowing a smaller loudspeaker to be used.

24 Claims, 5 Drawing Sheets

ACCOUSTIC CHAMBER INTEGRATED WITH VEHICLE DOOR

CROSS-REFERENCED TO RELATED APPLICATIONS

The present application claims benefit of U.S. Provisional Application Ser. No. 60/175,424, filed Jan. 11, 2000, the disclosure of which is hereby incorporated by reference herein.

BACKGROUND OF THE INVENTION

The present invention is related to sound systems for vehicles and is particularly directed to an acoustic chamber integrated into a door of a vehicle.

The earliest sound systems for motor vehicles typically included one or more loudspeakers mounted in a vehicle's instrument panel. In these systems, the sound generated by the loudspeakers was deflected off the windshield and into the passenger compartment toward vehicle occupants. Later sound systems included loudspeakers mounted atop a shelf located behind the rear seat of a vehicle, whereby the rear window of the vehicle directed sound into the passenger compartment. U.S. Pat. No. 4,728,143 to Tanino et al. is directed to overcoming problems associated with rear-shelf mounted loudspeakers by mounting one or more loudspeakers in a side door of a vehicle. In one embodiment of Tanino, an acoustic chamber and speaker are mounted within a vehicle door, whereby the speaker diaphragm is near the periphery of the acoustic chamber and in close proximity to the door trim panel.

U.S. Pat. No. 5,218,175 to Scarlata discloses a sound system for a vehicle that includes an elongated resonance chamber located outside the passenger compartment that resonates sound at lower frequencies than those generated by a speaker. The speaker is installed at one end of the elongated resonance chamber so that the air mass within the chamber is in front of the speaker diaphragm.

The latest sound systems include loudspeakers mounted in the side doors of vehicles. These door-mounted systems save valuable space within the passenger compartment and direct the sound at vehicle occupants. For example, U.S. Pat. No. 5,663,534 to Von Hagen discloses a sound system whereby a wall of a metal bodyshell part forms a part of a speaker housing. The wall of the metal bodyshell part includes an indentation that forms a rear half of the speaker housing. The speaker housing also includes a plastic half shell that holds the speaker. The plastic half shell has a reverse-shaped bulge that mirrors the indentation formed in the wall of the bodyshell part. A sealing strip is provided between the wall of the bodyshell part and the half shell for defining a closed resonance space for the speaker. There are a number of problems associated with the '534 patent. First, the metal bodyshell part that forms a rear part of the speaker housing is inappropriate for an acoustic environment. As a result, the sound quality of the system may suffer from transmission loss, frequency absorption and reflection. Second, the sound system of the '534 patent cannot be pre-tested before installation into a vehicle. Moreover, the system has extra components, such as the half-shell adding weight to the vehicle and providing little room for other door-mounted components such as a window lift system.

Thus, there is a need for an improved sound system for vehicles. For example, it would be desirable to provide a sound system including an acoustic chamber that can be tested before the system is actually installed in a vehicle. It would also be desirable to provide a sound system that is light-weight, easy to assemble, and has less parts.

SUMMARY OF THE INVENTION

Certain preferred embodiments of the present invention disclose an acoustic chamber for a loudspeaker, such as a stereo loudspeaker. The acoustic chamber is preferably integrated with a door of a vehicle having a passenger compartment. The door preferably includes a door inner panel having an aperture extending therethrough and a door outer panel that defines an exterior surface of the vehicle. The door inner panel and door outer panel are preferably made of metal, such as sheet metal, and are desirably permanently secured to one another, such as by welding the panels together. The acoustic chamber also desirably includes a door module, preferably made of a thermoplastic polymer or fibrous material, secured in the aperture of the door inner panel. The door module may include one or more control elements or control circuits mounted thereto such as elements for controlling a window, side-view mirror, seat adjustment, etc . . . . In preferred embodiments, the door module includes an indentation having a concave surface facing toward the passenger compartment of the vehicle.

An interior door trim panel is preferably secured over the door module. The acoustic chamber is desirably formed by providing a sealing element, such as a compliant sealing strip, between the door module and the interior door trim panel. In certain embodiments, the interior door trim panel may include a bulge that extends into the passenger compartment. The bulge may serve as an arm rest. In these embodiments, when the interior door trim panel is secured over the door module, the bulge is preferably in substantial alignment with the indentation and the sealing element desirably extends around outer perimeters of the indentation of the door module and the bulge of the interior door trim panel. The bulge in the interior door trim panel preferably defines a convex surface facing the passenger compartment of the vehicle.

The sound system desirably has a loudspeaker secured between the door module and the interior door trim panel. In other words, the loudspeaker is preferably secured within the acoustic chamber. In highly preferred embodiments, the speaker is secured in the indentation of the door module so that the diaphragm of the speaker faces toward the passenger compartment and the backside of the speaker faces the concave surface of the indentation. As a result, the acoustic chamber lies substantially between the back side of the speaker and the concave surface of the indentation so that most, if not all of the air mass within the acoustic chamber is behind the diaphragm of the speaker.

Although the present invention is not limited by any particular theory of operation, it is believed that the above-described arrangement allows a smaller loudspeaker to be used while providing satisfactory sound quality and performance at a lower cost. The above-identified benefits are obtainable because the loudspeaker is positioned within the acoustic chamber, with a large percentage of the mass of air within the acoustic chamber being located behind the diaphragm of the speaker. As a result, the sound system of the present invention takes up less space in the door of the vehicle so that the thickness of the door may be reduced.

The use of a smaller loudspeaker also reduces the weight of the vehicle, thereby improving fuel economy and handling. The present invention also provides a dramatic improvement in sound quality over the '534 patent to Von Hagen. The '534 patent uses a metal bodyshell part to form a part of a speaker housing, the metal part having poor acoustical qualities. The present invention does not use a metal part to form a portion of a speaker housing. The present invention also does not use a part of a vehicle bodyshell to form a speaker housing. Instead, the present invention uses a door module and interior door trim panel to form an acoustic chamber for a loudspeaker.

In another preferred embodiment of the present invention, a vehicle door having a built-in acoustic chamber includes a door outer panel and a door inner panel connected to one another, such as by welding or riveting. The door inner and outer panels are typically made of metal. The door inner panel desirably has an aperture extending therethrough, with a door module, preferably made of a plastic or fibrous material, at least partially secured within the aperture. The door module may include an indentation having a concave surface. When the door module is secured over the door inner panel, the indentation preferably faces toward a passenger compartment of a vehicle. The vehicle door also preferably includes a loudspeaker secured between the door module and the interior door trim panel. The loudspeaker may be at least partially secured within the indentation of the door module.

An interior door trim panel may be secured over the door module. The interior door trim panel preferably includes a bulge extending into the passenger compartment, the bulge of the interior door trim panel desirably opposing and/or being in substantial alignment with the indentation in the door module. A sealing element, such as a compliant sealing strip, may be secured between the door module and the interior door trim panel for forming an air-tight acoustic chamber integrated with the vehicle door. The loudspeaker is preferably secured within the acoustic chamber, the loudspeaker diaphragm desirably facing toward the interior door trim panel and the rear side of the speaker facing toward the indentation of the door module. In preferred embodiments, most of the air mass within the acoustic chamber is located behind the diaphragm of the speaker, i.e. between the rear side of the speaker and the indentation of the door module.

In yet another preferred embodiment of the present invention, an acoustic chamber and loudspeaker integrated with a vehicle door includes a door inner panel, preferably made of metal, having an aperture extending therethrough, and a door module secured to the door inner panel. The door module is preferably at least partially positioned within the aperture of the door inner panel. The door module preferably includes an indentation, and the loudspeaker may be secured within the indentation so that the diaphragm of the speaker faces away from the concave surface of the indentation. An interior door trim panel desirably overlies the door module. A sealing element, such as a compliant sealing strip, preferably extends between the door module and the interior door trim panel, the sealing element forming an acoustic chamber between the door module and the interior door trim panel. The door module may have one or more control devices mounted thereto that are desirably interconnected with functional elements of a vehicle (e.g. an electrically controlled side-view mirror). The one or more control devices may be movable for manipulating the functional elements.

In certain preferred embodiments, the interior door trim panel may include an opening is covered by a speaker grill. After the interior door trim panel is secured over the door, the opening may be in substantial alignment with the diaphragm of the speaker so that the speaker grill substantially overlies the diaphragm of the loudspeaker. In certain preferred embodiments, at least a portion of the speaker grill engages at least a portion of the diaphragm of the loudspeaker. In particular preferred embodiments, the speaker grill is flexible so that it may substantially conform to the diaphragm of the loudspeaker.

These and other preferred embodiments of the present invention will be described in more detail below.

DETAILED DESCRIPTION OF PREFERRED EMBODIMENTS

Figure 1:
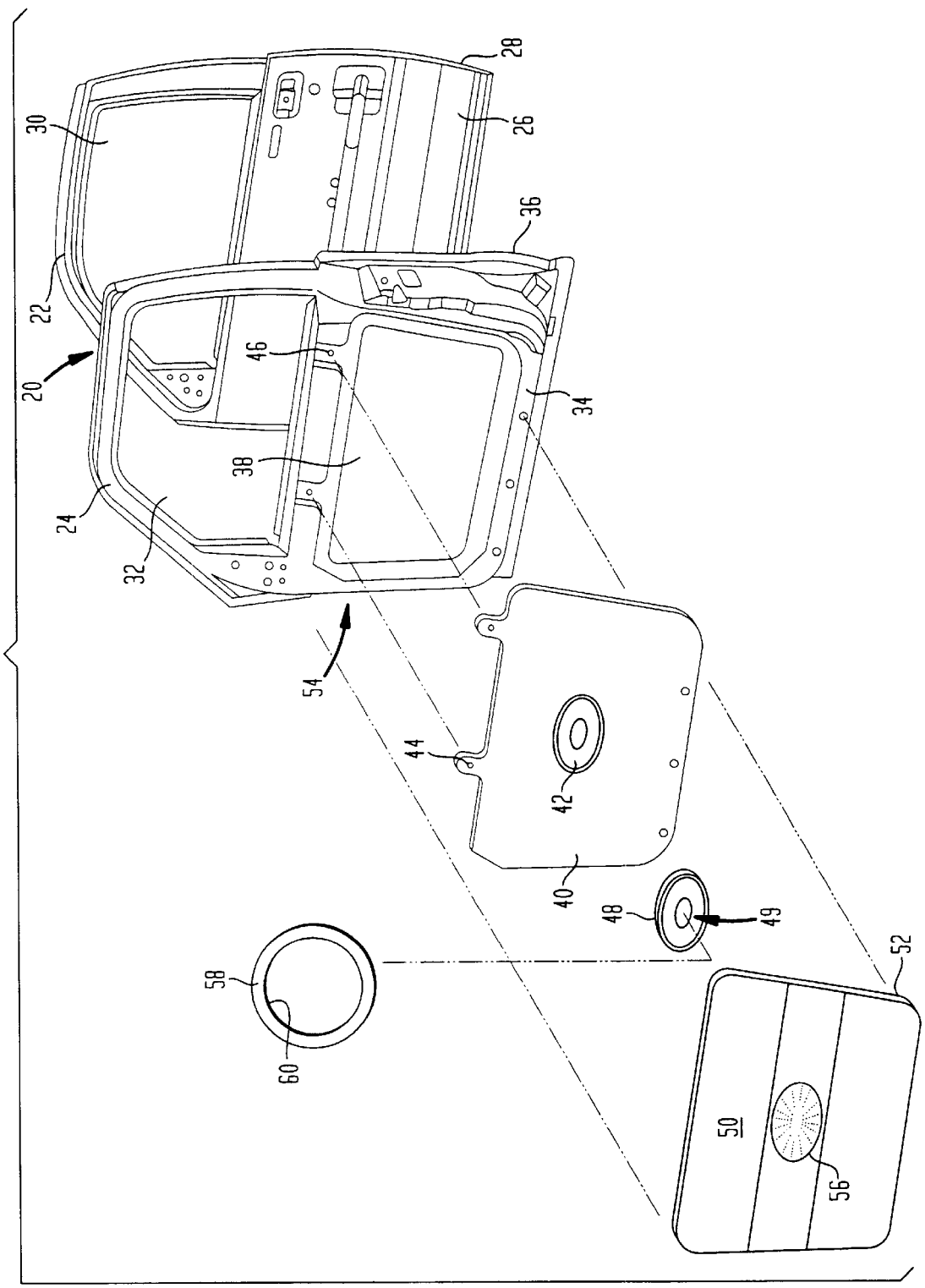
FIG. 1 shows an exploded view of an acoustic chamber integrated with a vehicle side door, in accordance with certain preferred embodiments of the present invention.

Referring to FIG. 1, in accordance with certain preferred embodiments of the present invention, a door 20 for a vehicle includes a door outer panel 22 and a door inner panel 24 that is adapted to be assembled with the door outer panel. In certain preferred embodiments, the door outer and inner panels 22, 24 are welded or riveted together. The door outer panel 22 includes an interior surface 26 and an outer surface 28 defining an exterior surface of the vehicle. The door inner and outer panels 22, 24 have respective window openings 30, 32 that are in substantial alignment with one another when the door inner and outer panels are assembled together. Door inner panel 24 has an interior surface 34 that typically faces toward a passenger compartment of a vehicle and an outer surface 36 that confronts the inner surface 26 of door outer panel 22. The door inner and outer panels 22, 24 preferably comprise metal, such as sheet metal.

Figure 2:
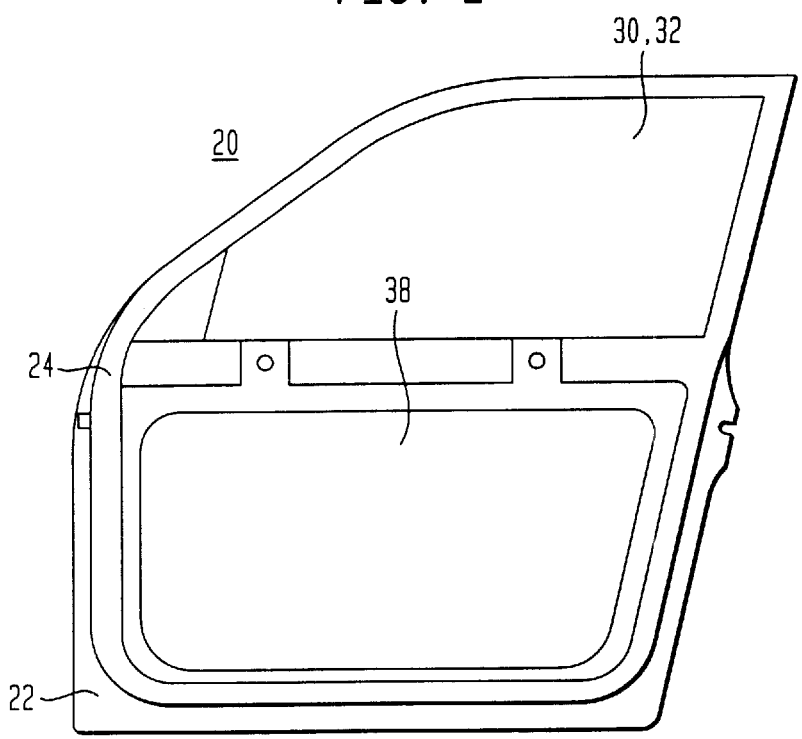
FIG. 2 shows a front elevational view of a door inner panel secured to a door outer panel, in accordance with certain preferred embodiments of the present invention.

Door inner panel 24 desirably includes an aperture 38 extending between the inner and outer surfaces 34, 36 thereof. FIG. 2 shows a front elevational view of door 20 including aligned window openings 30, 32 and aperture 38 extending through door inner panel 24. As mentioned above, door inner panel 24 is preferably assembled with door outer panel 22, such as by welding the respective panels together. The aperture 38 shown in FIG. 2 is substantially rectangular or square in shape, however, the aperture may have any geometric shape. The aperture 38 may also have an irregular shape with sides of non-uniform dimensions.

Figure 3:
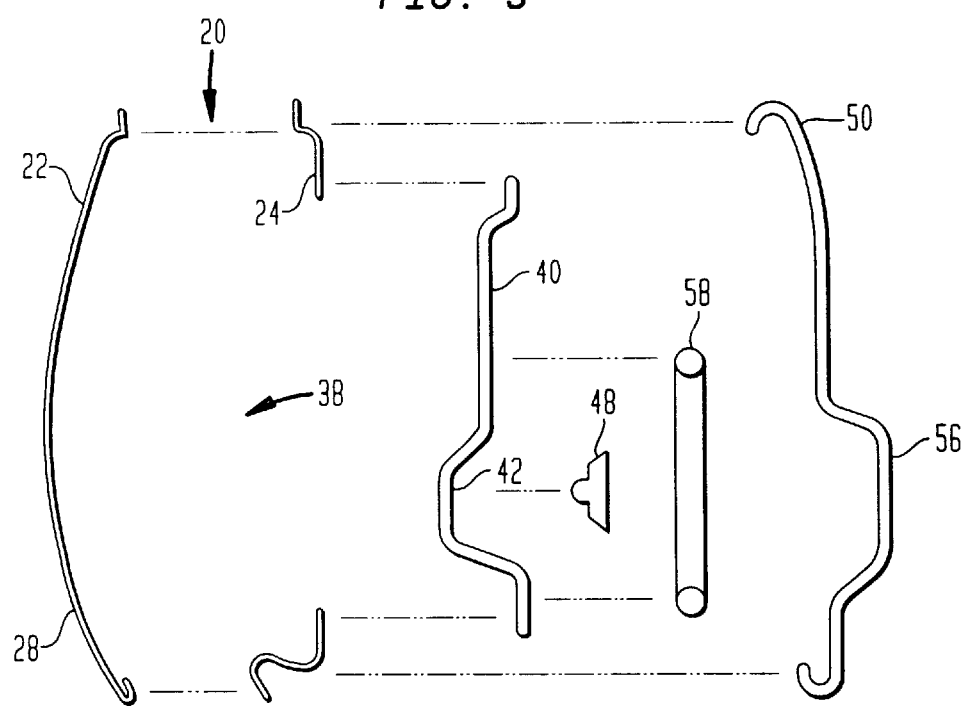
FIG. 3 shows an exploded, cross-sectional view of the acoustic chamber and door shown in FIG. 1.

Referring to FIGS. 1 and 3, door 20 is adapted to have an acoustic chamber including a loudspeaker integrated therewith. In certain preferred embodiments, a door module 40 having an indentation 42 formed therein is sized and shaped to be assembled with door inner panel 24. The door module 40 preferably covers at least a portion of aperture 38. In certain preferred embodiments, door module 40 is made of a thermoplastic polymer. Door module 40 may also be made of a fibrous material, such as wood or cellouse fiber. Door module 40 desirably includes one or more fastener openings extending therethrough. The fastener openings 44 (FIG. 1) are preferably alignable with a second set of openings 46 extending through door inner panel 24. As will be described in more detail below, when door module 40 is assembled with door inner panel 24, fasteners may be placed through the aligned openings 44, 46 so as to secure door module 40 to door inner panel 24.

Door module 40 includes indentation 42 which is preferably sized and shaped to at least partially receive a loudspeaker 48 that transforms electrical signals into audible sound. The indentation 42 in door module 40 preferably has a concave surface that faces toward the passenger compartment. The loudspeaker 48 is desirably assembled with the door module 40 so that the loudspeaker fits at least partially within indentation 42, and so that a diaphragm 49 of loudspeaker faces away from the concave surface of indentation 42 and toward the passenger compartment.

An interior door trim panel 50 desirably has an outer perimeter 52 that generally matches the perimeter of a lower portion 54 of door inner panel 24. Interior door trim panel 50 may include a bulge 56 integrally formed therewith. The bulge may extend into the passenger compartment of a vehicle and may have a convex surface facing toward the passenger compartment. Bulge 56 may include a plurality of openings extending therethrough for allowing sound generated by speaker 48 to pass therethrough.

Before interior door trim panel 50 is assembled over door module 40, a sealing element 58, such as a compliant sealing strip, is positioned between door module 40 and interior door trim panel 50. In certain preferred embodiments, the sealing element is an O-ring. Sealing element 50 preferably has an interior diameter 60 that is greater than the outer perimeters of indentation 42 and bulge 56. As interior door trim panel 50 is assembled over door module 40, the sealing element 58 is preferably disposed therebetween for forming an airtight seal around the outer perimeters of indentation 42 and bulge 56. Thus, the bulge 56, sealing element 58 and indentation 42 form an acoustic chamber integrated into door 20.

FIG. 3 shows an exploded, cross-sectional view of the door and acoustic chamber integrated therewith, in accordance with certain preferred embodiments of the present invention. As mentioned above, door 20 includes door outer panel 22 defining an exterior surface 28 of a vehicle and door inner panel 24 having aperture 38 extending therethrough. A door module 40 including indentation 42 is assembled with door inner panel 24 so that door module 40 covers at least a portion of aperture 38. Speaker 48 may be assembled with door module 40. In certain preferred embodiments, speaker 48 is at least partially positioned within the indentation 42 of door module 40. Sealing element 58 is provided between door module 40 and interior door trim panel 50. Interior door trim panel 50 preferably includes a bulge 56 having a concave surface that projects into a passenger compartment of a vehicle. When interior door trim panel 50 is assembled with door 20, the bulge 56 of interior door trim panel is in substantial alignment with the indentation 42 of door module 40. Sealing element 58 is preferably compliant and provides an airtight seal about the outer perimeters of indentation 42 and bulge 56, thereby forming an acoustic chamber.

Figure 4:
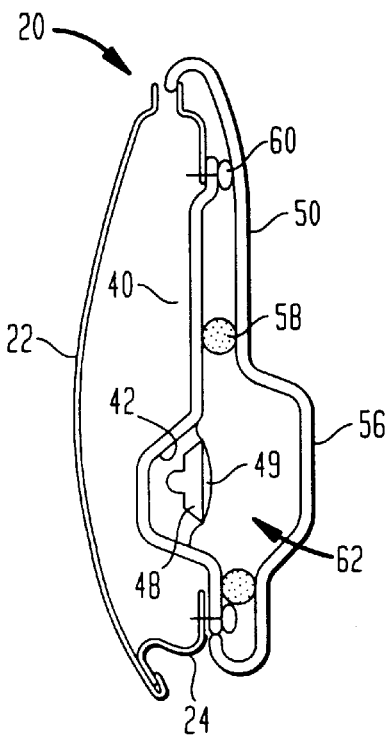
FIG. 4 shows the components of FIG. 3 in a fully assembled configuration.

FIG. 4 shows the components of FIGS. 1 and 3 in a fully assembled configuration with door outer panel 22 and door inner panel 24 assembled with one another. In certain preferred embodiments, door inner panel 24 may be welded or riveted to door outer panel 22. Door inner panel 24 has an aperture (FIG. 3), with door module 40 secured at least partially within the aperture. Door module 40 includes indentation 42 having a concave surface that faces toward the passenger compartment of a vehicle. Loudspeaker 48 is assembled with door module 40 and is preferably at least partially disposed within indentation 42. The loudspeaker 48 has diaphragm 49 that faces toward the passenger compartment of the vehicle and away from the concave surface of indentation 42. Door module 40 may be assembled with door inner panel 24 using fasteners 60, such as screws, nails or hooks. Interior door trim panel 50 having bulge 56 is assembled with door 20. In certain preferred embodiments, the peripheral edges of interior door trim panel 50 engage either door inner panel 24, module 40, or both. Sealing element 58 is desirably positioned between interior door trim panel 50 and door module 40 for forming an airtight acoustic chamber having speaker 48 secured therein. The airtight acoustic chamber 62 is preferably defined by indentation 42, bulge 56 and sealing element 58 extending around the outer peripheries of the indentation and the bulge.

Figure 5:
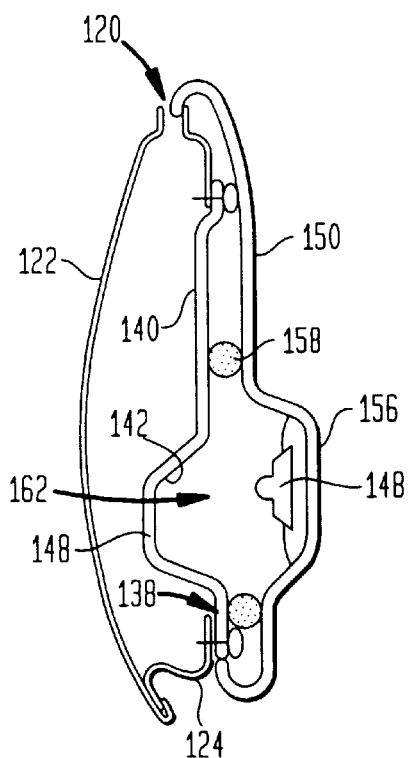
FIG. 5 show a cross-sectional view of an acoustic chamber integrated with a vehicle door, in accordance with another preferred embodiment of the present invention.

FIG. 5 shows an acoustic chamber for a loudspeaker integrated with a door 120 of a vehicle, in accordance with another preferred embodiment of the present invention. The assembly includes door outer panel 122 assembled with door inner panel 124 and door module 140 having indentation 142 being assembled in an aperture 138 of door inner panel 124. A speaker 148 is connected to interior door trim panel 150. A sealing element extends between door module 140 and interior door trim panel 150 for forming acoustic chamber 162. In the particular embodiment shown in FIG. 5, the speaker is secured within the bulge 156 of interior door trim panel 150.

Figure 6A:
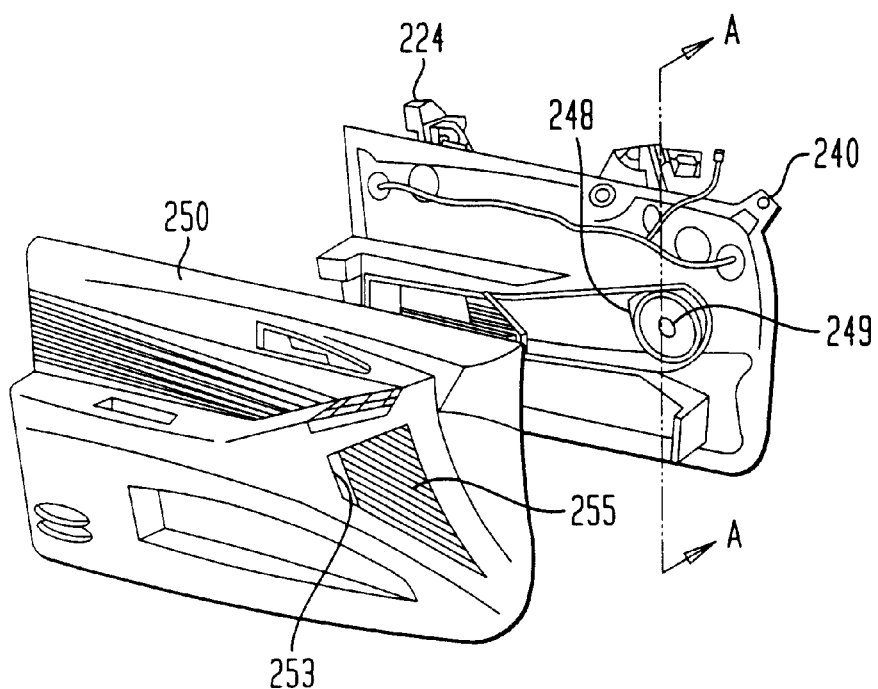
FIG. 6A shows a perspective view of an acoustic chamber integrated with a vehicle door, in accordance with yet another preferred embodiment of the present invention.
Figure 6B:
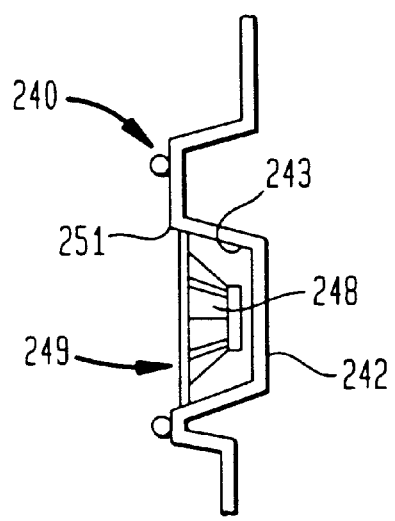
FIG. 6B shows a cross-sectional view of FIG. 6A taken along lines A—A thereof

Referring to FIG. 6A, a sound system integrated with a vehicle door in accordance with another preferred embodiment of the present invention includes door inner panel 224 having door module 240 secured thereto. Door inner panel 224 is preferably made of metal and door module 240 is preferably made of a thermoplastic material or fibrous material. Referring to FIGS. 6A and 6B, door module 240 has an indentation 242 formed therein. The indentation 242 defines a concave surface 243 that faces toward a passenger compartment of a motor vehicle. A speaker 248 having a diaphragm 249 is assembled with the door module 240. In the particular preferred embodiment shown in FIGS. 6A and 6B, the loudspeaker 248 is secured within indentation 242 so that diaphragm 249 is substantially coplanar with the innermost edge 251 of indentation 242.

Referring to FIG. 6A, interior door trim panel 250 includes an opening 253 that is covered by a speaker grill 255. In certain preferred embodiments, speaker grill 255 is made of a flexible material such as cloth.

Figure 7A:
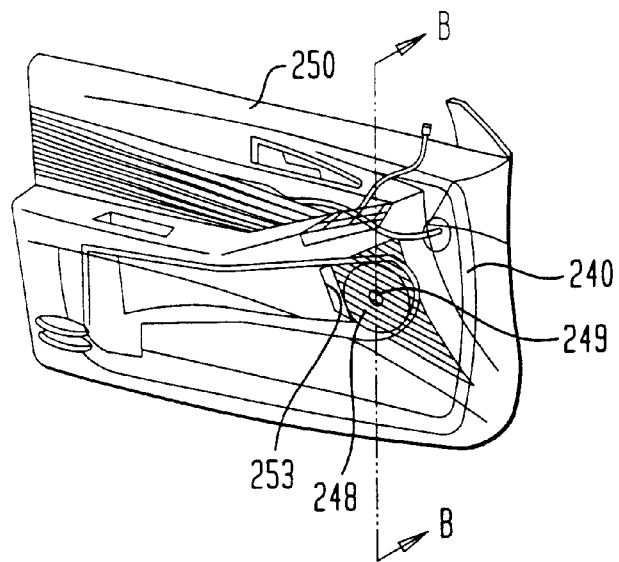
FIG. 7A shows the components of FIG. 6A in a fully assembled configuration.
Figure 7B:
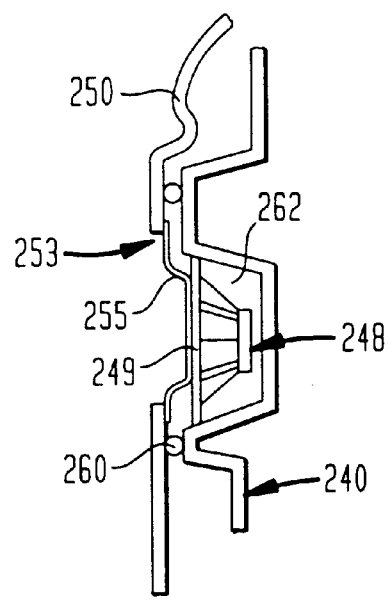
FIG. 7B shows a cross-sectional view of FIG. 7A taken along line B—B therof.

Referring to FIGS. 7A and 7B, interior door trim panel 250 is assembled over door module 240 so that the opening 253 of interior door trim panel 250 is in substantial alignment with the diaphragm 249 of speaker 248. Referring to FIG. 7B, after speaker 248 is secured within indentation 242 of door module 240, the diaphragm 249 of speaker 248 faces toward the passenger compartment of the vehicle. In other words, the diaphragm faces toward the opening 253 and interior door trim panel 250. The speaker grill 255 secured over the opening 253 in interior door trim panel 250 is preferably at least partially in contact with the diaphragm 249 of speaker 248. Thus, the speaker grill 255 may engage the diaphragm 249 of speaker 248. Sealing element 260 is preferably provided between door module 240 and interior door trim panel 250 to form an acoustic chamber therebetween. The acoustic chamber 262 is at least partially formed behind the speaker 248. In other words, most of the mass of air within acoustic chamber 262 lies behind diaphragm 249, i.e. between the diaphragm 249 and the concave surface 243 of indentation 242. As a result, the bulk of the air mass within the acoustic chamber 262 is located behind diaphragm 249.

Although the present specification discloses certain preferred embodiments, it is to be understood that these embodiments are merely illustrative of the principles and applications of the present invention. As such, numerous modifications may be made to the particular embodiments disclosed herein without departing from the scope of the present invention as defined by the appended claims.

What is claimed is:

1. An acoustic chamber formed in a door of a vehicle comprising:

said door including a door inner panel having an aperture extending therethrough;

a door module secured in the aperture of said door inner panel, wherein said door module includes an indentation;

an interior door trim panel overlying said door module;
        a loudspeaker secured between said door module and said interior door trim panel; and a sealing element between said door module and said interior door trim panel for forming an acoustic chamber, wherein said interior door trim panel includes a bulge opposing the indentation of said door module, and wherein said loudspeaker is located between the bulge and the indentation.

2. The acoustic chamber as claimed in claim 1, wherein said loudspeaker is at least partially secured within the indentation of said door module.

3. The acoustic chamber as claimed in claim 2, wherein said interior door trim panel includes a speaker grill in substantial alignment with said loudspeaker.

4. The acoustic chamber as claimed in claim 3, wherein said loudspeaker includes a diaphragm and at least a portion of said speaker grill engages said diaphragm.

5. The acoustic chamber as claimed in claim 1, wherein said door inner panel is made of metal.

6. The acoustic chamber as claimed in claim 1, wherein said vehicle includes a passenger compartment, and wherein the indentation in said door module has a concave surface facing said passenger compartment of said vehicle.

7. The acoustic chamber as claimed in claim 1, wherein said door module is made of a thermoplastic polymer or fibrous material.

8. The acoustic chamber as claimed in claim 1, wherein said vehicle includes a passenger compartment, and wherein the bulge in said interior door trim panel has a convex surface facing said passenger compartment.

9. The acoustic chamber as claimed in claim 1, wherein said sealing element extends around outer perimeters of the indentation of said door module and the bulge of said interior door trim panel.

10. The acoustic chamber as claimed in claim 1, wherein said sealing element is a sealing strip.

11. The acoustic chamber as claimed in claim 1, wherein said sealing element comprises a complaint material.

12. The acoustic chamber as claimed in claim 1, wherein said loud is located within said acoustic chamber.

13. An acoustic chamber formed in a door of a vehicle comprising:

said door including a door inner panel having an aperture extending therethrough;

a door module secured in the aperture of said door inner panel, wherein said door module includes an indentation;

an interior door trim panel overlying said door module;

a loudspeaker secured between said door module and said interior door trim panel;

a sealing element between said door module and said interior door trim panel for forming an acoustic chamber, wherein said door further comprises a door outer panel made of metal, said door outer panel defining an outer surface of said vehicle, wherein said door inner panel and said door outer panel are secured to one another.

14. A vehicle door having an acoustic chamber integrated therewith comprising:

said vehicle door including a door outer panel and a door inner panel, said door inner panel having an aperture, wherein said door outer panel and said door inner panel are connected to one another;

a door module secured in the aperture of said door inner panel, said door module including an indentation having a concave surface facing a passenger compartment of said vehicle;

an interior door trim panel secured to said door and overlying said door module;

a loudspeaker secured between said door module and said interior door trim panel; and a sealing element between said door module and said interior door trim panel for defining the acoustic chamber of said vehicle door, wherein said interior door trim panel includes a bugle extending into said passenger compartment, and wherein the bulge of said interior door trim panel substantially opposes the indentation of said door module.

15. The vehicle door as claimed in claim 14, wherein said interior door trim panel includes a speaker grill in substantial alignment with said loudspeaker.

16. The vehicle door as claimed in claim 14, wherein said loudspeaker includes a diaphragm and at least a portion of said speaker grill engages said diaphragm.

17. The vehicle door as claimed in claim 14, wherein said door inner panel and said door outer panel are made of metal.

18. The vehicle door as claimed in claim 14, wherein said door module is made of a thermoplastic polymer or fibrous material.

19. The vehicle door as claimed in claim 14, wherein said loudspeaker is secured at least partially within the indentation of said door module.

20. The vehicle door as claimed in claim 14, wherein said sealing element is a compliant strip extending around said loudspeaker between said door module and said interior door trim panel.

21. The vehicle door as claimed in claim 14, wherein said loudspeaker is located within said acoustic chamber.

22. An acoustic chamber for a loudspeaker comprising:

a door inner panel of a vehicle door having an aperture extending therethrough, wherein said door inner panel is made of metal;

a door outer panel made of metal, said door outer panel defining an outer surface of said vehicle, wherein said door inner panel and said door outer panel are secured to one another;

a door module secured to said door inner panel and overlying the aperture thereof, said door module including an indentation;

an interior door trim panel overlying said door module; a loudspeaker secured between said door module and said interior door trim panel; and a sealing element extending between said door module and said interior door trim panel for defining said acoustic chamber, wherein said loudspeaker is located within said acoustic chamber.

23. The acoustic chamber as claimed in claim 22, wherein said door module has one or more control devices secured thereto, said control devices being interconnected with functional elements of a vehicle.

24. The acoustic chamber as claimed in claim 23, wherein said one or more control devices are movable.

\* \* \* \* \*

UNITED STATES PATENT AND TRADEMARK OFFICE
CERTIFICATE OF CORRECTION

PATENT NO.     : 6,578,658 B2
DATED          : June 17, 2003
INVENTOR(S)    : Stephen P. Jones et al.

It is certified that error appears in the above-identified patent and that said Letters Patent is hereby corrected as shown below:

<u>Column 7,</u>
Line 67, "loud" should read -- loudspeaker --.

Signed and Sealed this

Sixteenth Day of September, 2003

JAMES E. ROGAN
*Director of the United States Patent and Trademark Office*